(12) United States Patent
Otten et al.

(10) Patent No.: US 9,109,665 B2
(45) Date of Patent: Aug. 18, 2015

(54) POWER SHIFT TRANSMISSION

(71) Applicant: Deere & Company, Moline, IL (US)

(72) Inventors: Ulrich Otten, Speyer (DE); Martin Schaller, Bad Koenig (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/355,205

(22) PCT Filed: Oct. 17, 2012

(86) PCT No.: PCT/EP2012/070539
§ 371 (c)(1),
(2) Date: Apr. 29, 2014

(87) PCT Pub. No.: WO2013/064370
PCT Pub. Date: May 10, 2013

(65) Prior Publication Data
US 2014/0296023 A1    Oct. 2, 2014

(30) Foreign Application Priority Data
Oct. 31, 2011   (DE) .................. 10 2011 085 495

(51) Int. Cl.
| | |
|---|---|
| *F16H 3/44* | (2006.01) |
| *F16H 3/46* | (2006.01) |
| *F16H 3/56* | (2006.01) |
| *B60K 17/28* | (2006.01) |
| *F16H 37/04* | (2006.01) |

(52) U.S. Cl.
CPC .. *F16H 3/46* (2013.01); *F16H 3/56* (2013.01); *B60K 17/28* (2013.01); *F16H 37/046* (2013.01); *F16H 2200/0004* (2013.01); *F16H 2200/0034* (2013.01); *F16H 2200/2007* (2013.01); *F16H 2200/2038* (2013.01)

(58) Field of Classification Search
CPC ..... F16H 3/46; F16H 3/56; F16H 2200/2007; F16H 2200/0004; F16H 2200/2038; F16H 37/046; F16H 2200/0034; B60K 17/28
USPC ......... 475/311, 331, 288, 313, 220, 221, 225, 475/248, 252, 253
See application file for complete search history.

(56) References Cited

U.S. PATENT DOCUMENTS

| | | |
|---|---|---|
| 3,772,939 A | 11/1973 | Hause |
| 4,189,962 A | 2/1980 | Chung |

(Continued)

FOREIGN PATENT DOCUMENTS

| | | |
|---|---|---|
| CH | 257919 A | 10/1948 |

OTHER PUBLICATIONS

International Search Report for related application PCT/EP2012/070539, dated Jan. 10, 2013.

*Primary Examiner* — David J Hlavka
(74) *Attorney, Agent, or Firm* — Quarles & Brady LLP

(57) ABSTRACT

A power shift transmission has an input shaft, a first output shaft coaxial to the input shaft, a planetary transmission with a planet carrier, which is connected to the input shaft, and at least three shift elements. To minimize drag from open shift elements and to optimize shift times of a connectable synchromesh transmission, the planetary transmission has at least two stepped planetary sets, which may be mounted on a common planet carrier. Each stepped planetary set meshes on input and output sides with at least one sun gear. The first output shaft is connected to an output side sun associated with one stepped planetary set by a first shift element, the first output shaft is connected to an output side sun associated with another stepped planetary set by a second shift element, and input side sun gears are blocked relative to the transmission housing by a third shift element.

9 Claims, 1 Drawing Sheet

(56) References Cited

U.S. PATENT DOCUMENTS

| | | | |
|---|---|---|---|
| 4,523,493 A * | 6/1985 | Wei.beta. | 475/205 |
| 4,942,779 A * | 7/1990 | Ohkubo | 475/39 |
| 5,947,858 A * | 9/1999 | Williams | 475/206 |
| 6,685,593 B1 * | 2/2004 | Meier-Burkamp et al. | 475/35 |
| 7,276,008 B2 * | 10/2007 | Yasui et al. | 475/5 |
| 8,197,373 B2 * | 6/2012 | Akutsu et al. | 475/5 |
| 8,622,863 B2 * | 1/2014 | Kurokawa | 475/5 |
| 2010/0081545 A1 * | 4/2010 | Shimizu et al. | 477/130 |

* cited by examiner

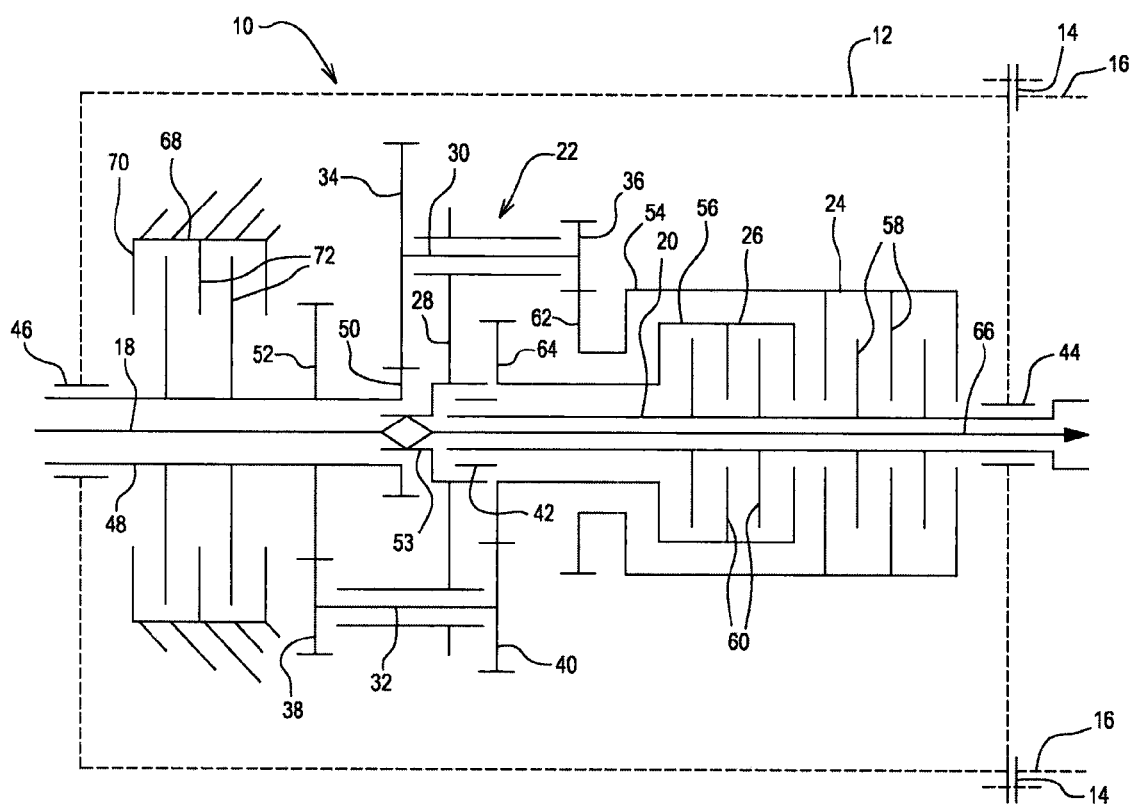

//POWER SHIFT TRANSMISSION

CROSS-REFERENCE TO RELATED APPLICATION(S)

This application claims priority under 35 U.S.C. §119 to international application No. PCT/EP2012/070539, filed Oct. 17, 2012, which claims priority to German patent application DE 102011085495.9, filed Oct. 31, 2011, the disclosure of which is incorporated herein by reference.

STATEMENT OF FEDERALLY SPONSORED RESEARCH OR DEVELOPMENT

Not applicable.

FIELD OF THE DISCLOSURE

This disclosure concerns a power shift transmission with an input shaft, a first output shaft arranged coaxially to the input shaft, a planetary transmission with a planet carrier connected to the input shaft and at least three shift elements

BACKGROUND OF THE DISCLOSURE

A power shift transmission is disclosed, for example, in CH 257919. An automatic transmission is described here, in which a first clutch in a first gear stage serves as a transmission component between a drive shaft and a first intermediate shaft, whereby the latter is connected to a drive shaft via a three-stage planetary set. In a second gear stage, the drive shaft is connected to a second intermediate shaft via a second clutch, whereby the latter is connected to the drive shaft via the same planetary set, albeit with a different gear ratio. In a third gear stage, the drive shaft is connected directly to the planet carrier via the second and a third clutch, which allows an additional gear ratio for the drive shaft over the planetary set. Thus, a three-stage power shift transmission is provided that is, however, on the one hand complexly configured from a manufacturing standpoint, and on the other hand altogether fraught with high drag torque losses and high pitch power, because in both the first and the second gear stages, two clutches are open at a time, or in each case the planetary set then serves as an intermediate transmission structure. In addition, due to a linear proportional correlation between inertia and shifting time, the overall high inertia of the arrangement has an unfavorable effect on the shifting behavior of a potential main or auxiliary transmission arrayed downstream.

SUMMARY OF THE DISCLOSURE

The disclosure provides a power shift transmission that overcomes the previously stated problems.

According to one aspect of the disclosure, a power shift transmission is configured in such a way that a planetary transmission has at least two stepped planetary sets, which are mounted on a planet carrier, such as a common planet carrier, and whereby each stepped planetary set meshes on an input side and an output side with an associated one of at least two sun gear sets. The assembly is configured such that the first output shaft can be connected to an output side sun associated with one stepped planetary set by a first of at least three shift elements, the first output shaft can be connected to an output side sun associated with another stepped planetary set by a second of the at least three shift elements, and input side sun gears can be blocked by a third of the at least three shift elements.

In certain embodiments, two stepped planetary sets can be mounted on only one planet carrier directly connected to the input shaft, and the output shaft and the first and second shift elements mounted on it may be in a coaxial arrangement. These aspects allow only one shift element to be in the open state for each operating mode of the transmission, which has the effect of reducing drag torques. In addition, the intermediate transmission structure is dispensed with, which results in low rolling friction losses.

In certain embodiments, the power shift transmission may be of a compact arrangement, in particular the design of the output shaft and the elements connected to it. It may be constructively simple to manufacture and have low inertias, through which particularly the shift times for a synchromesh coupled to the power shift transmission are significantly reduced as well, and the shift performance or the shift behavior are accordingly improved. Overall, this leads to a significant increase of efficiency in comparison to other known power shift transmissions. Moreover, an extremely compact arrangement may be achieved that also is easy to manufacture, because among other things a hollow wheel in the planetary transmission can be dispensed with completely, so that the complexity of manufacturing methods can be reduced.

A connection of the output side sun gears with the first output shaft, as well as the blocking of the input side sun gears, can occur in each case by closing the appropriate shift elements, so that for each operating condition of the power shift transmission, two shift elements at a time are closed. Here and in the following, particularly in the patent claims, the term shift element is to be understood as representing mechanisms with which turning transmission components can be brought into torque-proof connection with one another and released again. Examples of clutches that can be used for this are multiple disk clutches or jaw clutches or the like.

The input side sun gears are mounted, in a torque-proof manner, on a hollow shaft mounted coaxially to the input shaft. The input side sun gears of both stepped planetary sets can thus be blocked by blocking the hollow shaft via the third shift element. Input side here means that the sun gears are arrayed on the input shaft side of the planetary set. Other arrangements are conceivable here as well, as long as it is ensured that the two input side sun gears of the planetary sets are directly or indirectly connected with one another in a torque-proof manner, and can assume a disengaged or a blocked operating condition.

The first output shaft is configured as a hollow shaft, through which extends a second output shaft that is connected to the input shaft. The second output shaft is connected to the input shaft via a rigid coupling or a locking device. The second output shaft can serve, for example, as the actuator for a power take-off transmission, or can itself be configured as a power take-off.

The first and second shift elements are configured as clutches, whereby the clutches each exhibit a clutch member, for example on the input side, that is connected to one of the output side sun gears, and whereby the clutches each exhibit a different clutch member, for example on the output side, that is connected to the output shaft in a torque-proof manner. By connecting the two clutch members of one or both clutches, i.e. by closing one or both clutches, the first output shaft is connected to one or both output side sun gears in a torque-proof manner. Output side here means that the sun gears are arrayed on the output shaft side of the planetary set. Other arrangements are conceivable here as well, as long as it is ensured that the two output side sun gears of the planetary sets can, independently of one another via shift elements, be directly or indirectly connected to the first output shaft in a torque-proof manner, and can thus assume an operating condition either connected to the first output shaft or separated from the first output shaft.

The third shift element can be configured as a brake, whereby the brake is connected, in a torque-proof manner, on the input side to the hollow shaft mounted coaxially to the input shaft, and on the output side to a housing component of the power shift transmission. In this respect, the brake is also a clutch in the sense described above, except that here a rotatable transmission component, namely the hollow shaft mounted coaxially to the input shaft, is connected to a housing component or to a transmission component mounted on the housing in a torque-proof manner, and they are not transmission components that rotate on both sides of the connection.

The power shift transmission can be configured in such a way that by closing the first and second, and opening the third shift element, in other words, for example, by closing the two clutches and opening the brake, a first operating mode is possible, in which the direction of rotation and the rotational speed of the input shaft and the first output shaft are the same. The power shift transmission can thus be operated in a direct drive mode (gear ratio i=1). The power shift transmission can also be configured in such a way that by closing the third and the first or second, and opening the second or the first shift element, in other words, for example, by closing the brake and the first clutch and opening the second clutch, a second operating mode is possible, in which the direction of rotation of the input shaft and the first output shaft are the same and the rotational speeds are different. The power shift transmission can thus be operated in an underdrive mode (gear ratio i>1).

In addition, the power shift transmission can be configured in such a way that by closing the third and the second or first, and opening the first or the second shift element, in other words, for example, by closing the brake and the second clutch and opening the first clutch, a third operating mode is possible, in which the direction of rotation and the rotational speeds of the input shaft and the first output shaft are different. The power shift transmission can thus be operated in a reverse mode (gear ratio i<0).

By means of the drawing depicting an example of the disclosure, the disclosure, as well as additional benefits and advantageous further developments and embodiments of the disclosure, are described in more detail and explained in the following description.

BRIEF DESCRIPTION OF THE DRAWING

FIG. 1 shows a transmission diagram for a power shift transmission according to the disclosure.

DETAILED DESCRIPTION

The following describes one or more example embodiments of the disclosed power shift transmission. Various modifications to the example embodiment(s) may be contemplated by one of skill in the art.

An example power shift transmission 10 shown in FIG. 1, which is configured as an input transmission module and comprises a housing 12, which can, for example, be mounted on a main transmission housing 16 via a flange assembly 14, and can be combined with a main transmission module (not depicted) of an agricultural vehicle, for example a tractor or a hauler.

The power shift transmission 10 has an input shaft 18 and an output shaft 20 that can be brought into drive connection via a planetary transmission 22 and a first and second shift element 24, 26.

The planetary transmission 22 exhibits a planet carrier 28, on which a first two-stepped planetary set 30 and a second two-stepped planetary set 32 are rotatably mounted. The first two-stepped planetary set 30 comprises an input side planetary gear 34 and an output side planetary gear 36. The second two-stepped planetary set 32 comprises an input side planetary gear 38 and an output side planetary gear 40.

The planet carrier 28 is connected to the input shaft 18 in a torque-proof manner, whereby the planet carrier 28 is mounted on the first output shaft 20 via a first anti-friction bearing 42. The first output shaft 20 is mounted on the output side on the housing 12 via a second anti-friction bearing 44. A third anti-friction bearing 46 is configured on the input side on the housing 12. An input side hollow shaft 48 is mounted in the third anti-friction bearing 46.

A first input side sun gear 50 and a second input side sun gear 52 are arranged in a torque-proof manner on the input side hollow shaft 48. The input shaft 18 extends coaxially through the input side hollow shaft 48, which is connected to the planet carrier 28 in a torque-proof manner via a fixed clutch array 53.

The shift elements 24, 26 are configured as multiple disk clutches and in each case exhibit a clutch housing component 54 or 56, rotatably mounted on the first output shaft 20, that in each case can be connected to the first output shaft 20 in a torque-proof manner via a disk arrangement 58 or 60 that can be made to mesh. In the process, the shift elements 24, 26 are arranged coaxially to the first output shaft 20, whereby the clutch housing component 56 of the second shift element 26 is mounted in the clutch housing component 54 of the first shift element 24.

The clutch housing component 54 of the first shift element 24 is connected to a first output side sun gear 62 in a torque-proof manner. The clutch housing component 56 of the first shift element 26 is connected to a second output side sun gear 64 in a torque-proof manner. By closing the disk arrangement 58 or 60, the output side sun gears 62 or 64 are respectively connected to the output side planetary gears 36 or 40 in a torque-proof manner.

The first output shaft 20 is configured as a hollow shaft, through which extends a second output shaft 66 that is connected to the input shaft 18 via the fixed coupling arrangement 53.

The input side hollow shaft 48 is connected to a third shift element 68. The third shift element 68 is configured as a brake and exhibits a braking body component 70 that is fixed to the housing 12, and can be connected to the input side hollow shaft 48 in a torque-proof manner via a disk arrangement 72. By closing the disk arrangement 72 of the third shift element 68, the input side hollow shaft 48 is connected to the housing 12 in a torque-proof manner and blocked, so that also the input side sun gears 50 and 52 are blocked versus the transmission housing 12.

Starting from the input side of the power shift transmission, gear pairs with the following gear ratios are arranged:

The input side planetary gear 34 of the first planetary set 30 meshes with the first input side sun gear 50 in a gear ratio of 50/33.

The input side planetary gear 38 of the second planetary set 32 meshes with the second input side sun gear 52 in a gear ratio of 22/61.

The output side planetary gear 36 of the first planetary set 30 meshes with the first output side sun gear 62 in a gear ratio of 16/67.

The output side planetary gear 40 of the second planetary set 32 meshes with the second output side sun gear 64 in a gear ratio of 35/48.

By shifting (opening or closing) the shift elements 24, 26 and 68 (clutch 24, clutch 26 and brake 68), the following operating conditions for the power shift transmission can then be achieved. By closing the first and second shift element 24, 26, and opening the third shift element 68, in other words by closing the two clutches 24, 26 and opening the brake 68, a first operating mode is possible, in which the input shaft 18 is directly connected to the first output shaft 20 via the planet carrier 28, as well as via the tightly fitted gear pairs of the output side planet gear 36 and the output side sun gear 62, or the output side planet gear 40 and the output side sun gear 64, so that the direction of rotation and the rotational speed of the input shaft 18 and the first output shaft 20 are the same. The power shift transmission is then operated in the so-called direct drive mode with a gear ratio of i=1 and a resulting efficiency of 0.988, which represents a significant optimization in comparison to conventional power shift transmissions of the same type.

By closing the first and third shift element 24, 68, and opening the second shift element 26, in other words by closing the clutch 24 and the brake 68 and opening the clutch 26, a second operating mode is possible, in which the first output shaft 20 is driven via the first planet carrier 30, whereby, due to the blocked input side sun gears 50, 52, the planetary sets 30 and 32 roll around the sun gears and the output occurs over the gear pair of the output side planetary gear 36 and the output side sun gear 62 in connection with the first shift element 24 (clutch 24), so that the direction of rotation of the input shaft 18 and the first output shaft 20 are the same and the rotational speeds are different. The power shift transmission is then operated in the so-called underdrive mode with a gear ratio of i=1.19 and a resulting efficiency of 0.972, which likewise represents a significant optimization in comparison to conventional power shift transmissions of the same type.

By closing the second and third shift element 26, 68, and opening the first shift element 24, in other words by closing the clutch 26 and the brake 68 and opening the clutch 24, a second operating mode is possible, in which the first output shaft 20 is driven via the second planet set 32, whereby, due to the blocked input side sun gears 50, 52, the planetary sets 30 and 32 roll around the sun gears and the output occurs over the gear pair of the output side planetary gear 40 and the output side sun gear 64 in connection with the second shift element 26 (clutch 26), so that the direction of rotation and the rotational speeds of the input shaft 18 and the first output shaft 20 are different. The power shift transmission is then operated in the so-called reverse mode with a gear ratio of i=−0.98 and a resulting efficiency of 0.919.

Therefore, three different operating modes are made possible, whereby two of the shift elements 24, 26, 68 are closed at a time in each operating mode and, because of that, drag losses are significantly reduced in comparison to the state of the art.

Although the disclosure was described based on the above example(s), in light of the preceding description and the drawing, one of skill in the art will understand that many different alternatives, modifications and variants may fall within the invention defined by the following claims.

The invention claimed is:

1. A power shift transmission, comprising:
an input shaft;
a first output shaft arranged coaxially to the input shaft;
at least three shift elements; and
a planetary transmission having a planet carrier, at least two stepped planetary gear sets, and at least two sun gear sets, wherein the planet carrier carries the at least two stepped planetary gear sets and is coupled to the input shaft;
wherein a first of the at least two stepped planetary gear sets includes a first input side planet gear and a first output side planet gear, and a second of the at least two stepped planetary gear sets includes a second input side planet gear and a second output side planet gear, and wherein a first of the at least two sun gear sets includes a first input side sun gear and a first output side sun gear, and a second of the at least two sun gear sets includes a second input side sun gear and a second output side sun gear, whereby the first and second input side planet gears mesh with the associated first and second input side sun gears, and the first and second output side planet gears mesh with the associated first and second output side sun gears; and
wherein in a first operating condition the first output shaft is connected to the first output side sun gear by a first of the at least three shift elements, wherein in a second operating condition the first output shaft is connected to the second output side sun gear by a second of the at least three shift elements, and in a third operating condition the first and second input side sun gears are blocked by a third of the at least three shift elements.

2. The power shift transmission of claim 1, wherein for each operating condition of the power shift transmission, two of the at least three shift elements are closed.

3. The power shift transmission of claim 2, wherein in the first operating condition the first and the second of the at least three shift elements are closed and the third of the at least three shift elements is open, whereby in the first operating condition the direction of rotation and the rotational speed of the input shaft and the first output shaft are the same.

4. The power shift transmission of claim 3, wherein in the second operating condition the first and third of the at least three shift elements are closed and the second of the at least three shift elements is open, whereby in the second operating condition the direction of rotation of the input shaft and the first output shaft are the same and their rotational speeds are different.

5. The power shift transmission of claim 4, wherein in the third operating condition the second and third of the at least three shift elements are closed and the first of the at least three shift elements is open, whereby in the third operating condition the direction of rotation and the rotational speed of the input shaft and the first output shaft are different.

6. The power shift transmission of claim 1, wherein the first and second input side sun gears are mounted in a torque-proof manner on a hollow shaft mounted coaxially to the input shaft, whereby the first and second input side sun gears are blocked by engaging the hollow shaft with the third of the at least three shift elements.

7. The power shift transmission of claim 6, wherein the third of the at least three shift elements is configured as a brake, whereby the brake is connected in a torque-proof manner on an input side to the hollow shaft and on an output side to a housing component of the power shift transmission.

8. The power shift transmission of claim 1, wherein the first output shaft is configured as a hollow shaft through which extends a second output shaft that is connected to the input shaft.

9. The power shift transmission of claim 1, wherein the first and second of the at least three shift elements are configured as clutches, whereby the clutches are connected in a torque-proof manner on an input side with one of the output side sun gears and on an output side with the first output shaft.

* * * * *